(12) United States Patent
Siegel

(10) Patent No.: US 9,300,794 B2
(45) Date of Patent: Mar. 29, 2016

(54) UNIVERSAL ACCESS TO CALLER-SPECIFIC RINGTONES

(75) Inventor: Laurence R. Siegel, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1529 days.

(21) Appl. No.: 12/369,928

(22) Filed: Feb. 12, 2009

(65) Prior Publication Data

US 2010/0202604 A1 Aug. 12, 2010

(51) Int. Cl.
*H04M 3/42* (2006.01)
*H04M 19/04* (2006.01)

(52) U.S. Cl.
CPC ........ *H04M 3/42017* (2013.01); *H04M 19/041* (2013.01)

(58) Field of Classification Search
CPC ............... H04M 3/42229; H04M 3/42017; H04M 3/02; H04Q 3/0029
USPC ................. 379/201.02, 207.16; 709/204–206
See application file for complete search history.

(56) References Cited

U.S. PATENT DOCUMENTS

| | | | | |
|---|---|---|---|---|
| 7,613,287 | B1* | 11/2009 | Stifelman et al. | 379/215.01 |
| 7,660,715 | B1* | 2/2010 | Thambiratnam | 704/244 |
| 2004/0066920 | A1* | 4/2004 | Vandermeijden | 379/88.19 |
| 2005/0143054 | A1* | 6/2005 | Fogel | 455/415 |
| 2006/0177044 | A1* | 8/2006 | O'Neil et al. | 379/373.02 |
| 2006/0199570 | A1* | 9/2006 | Vendrow | 455/415 |
| 2006/0259434 | A1* | 11/2006 | Vilcauskas et al. | 705/57 |
| 2007/0014314 | A1* | 1/2007 | O'Neil | 370/503 |
| 2007/0171880 | A1* | 7/2007 | Ismail | 370/338 |
| 2007/0189503 | A1* | 8/2007 | Pearson et al. | 379/355.04 |
| 2007/0264978 | A1* | 11/2007 | Stoops | 455/414.1 |
| 2008/0040211 | A1* | 2/2008 | Walker et al. | 705/14 |
| 2008/0057902 | A1* | 3/2008 | Sidon | 455/401 |
| 2008/0215319 | A1* | 9/2008 | Lu et al. | 704/231 |
| 2008/0293390 | A1* | 11/2008 | Yang et al. | 455/414.1 |
| 2010/0119051 | A1* | 5/2010 | Belz et al. | 379/207.16 |

OTHER PUBLICATIONS

Abstract entitled "SyncML Sync Protocol," Version 1.1, Copyright, 2000-2002 by Ericsson, IBM, Lotus, Matsushita Communications Industrial Co., Ltd., Motorola, Nokia, Openwave, Palm, Psion, Starfish Software, Symbian, and others. Dated Feb. 15, 2002; 62 pages.

* cited by examiner

*Primary Examiner* — Oleg Asanbayev
(74) *Attorney, Agent, or Firm* — Hartman & Citrin LLC

(57) ABSTRACT

Methods, systems, and computer-readable media for providing universal access to caller-specific ringtones are described. A universal address book server is implemented that contains user-specific address books for users of a communications network. Each address book includes ringtones associated with contacts and groups defined in the address book. The universal address book server also provides a synchronization service to the communication devices of each user allowing the communication devices to synchronize the ringtones associated with the contacts and groups between the user's address book on the universal address book server and a local storage of the ringtones in the communication device.

17 Claims, 6 Drawing Sheets

UNIVERSAL ACCESS TO CALLER-SPECIFIC RINGTONES

BACKGROUND

This disclosure relates generally to the field of network and communication services. More specifically, the disclosure provided herein relates to providing universal access to caller-specific ringtones.

Many cellular telephones and other communication devices allow a user to associate a specific ringtone with an individual stored in a contact list of the device. In this way, when receiving a call from the individual, the device will signal the user of the incoming call using the caller-specific ringtone, aurally notifying the user of the identity of the caller without the user having to view caller ID information on a display of the device. This capability, however, has traditionally been localized to each particular device, requiring the user to setup each individual contact and associate a ringtone with the contact on each device the user owns or operates.

SUMMARY

It should be appreciated that this Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments of the disclosure presented herein include methods, systems, and computer-readable media for providing universal access to caller-specific ringtones. According to aspects, a universal address book server is implemented that contains user-specific address books for users of a communications network. Each address book includes ringtones associated with contacts and groups defined in the address book. The universal address book server also provides a synchronization service to the communication devices of each user allowing the communication devices to synchronize the ringtones associated with the contacts and groups between the user's address book on the universal address book server and a local storage of the ringtones in the communication device. Each of the communication devices may then play the ringtone associated with the contact on a speaker of the device upon receiving an incoming communication from the contact over the communications network.

Other systems, methods, and/or computer program products according to embodiments will be or become apparent to one skilled in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for providing network-based universal access to caller-specific ringtones and ringback tones. Utilizing the technologies described herein, a user of one or more communication devices attached to the network can associate a specific ringtone with an individual or a group of individuals in a universal address book located on the network. Subsequently, whenever the user receives a call or other communication from the individual or a member of the group, the user will be informed of the call using the specific ringtone associated with that individual or group, regardless of the communication device upon which the communication is received. This allows the user to set up the individuals, groups, and associated ringtones in the universal address book only once and have the caller-specific ringtones universally accessible to all of the user's devices attached to the network.

Figure 1:
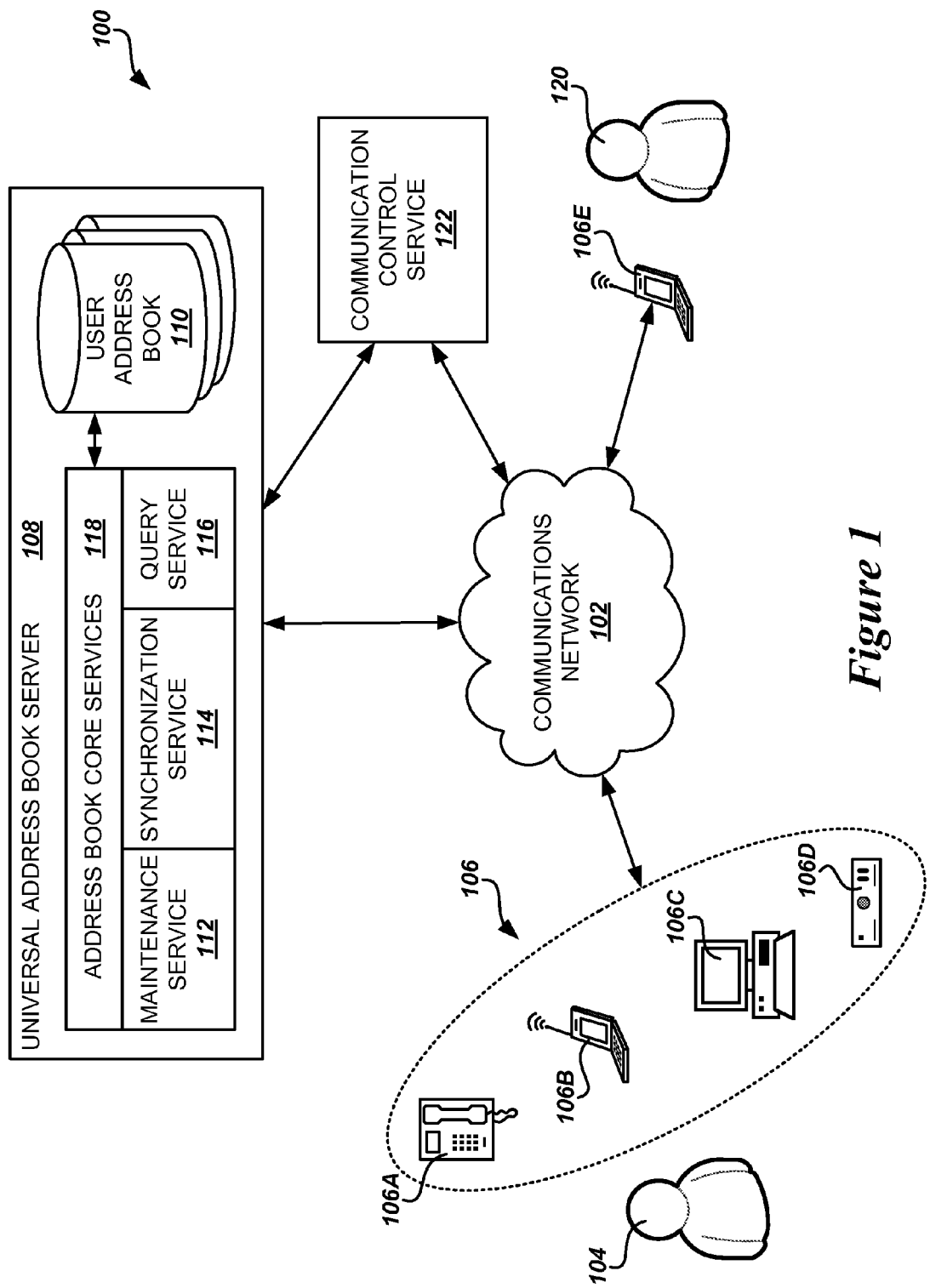
FIG. 1 is a block diagram illustrating an operating environment for providing universal access to caller-specific ringtones, in accordance with exemplary embodiments.

In the following detailed description, references are made to the accompanying drawings that form a part hereof, and that show by way of illustration specific embodiments or examples. In referring to the drawings, it is to be understood that like numerals represent like elements through the several figures, and that not all components described and illustrated with reference to the figures are required for all embodiments. Referring now to FIG. 1, an illustrative operating environment 100 and several hardware and software components for providing universal access to caller-specific ringtones is shown, according to embodiments.

The environment 100 includes a communications network 102. According to embodiments, the communications network 102 comprises an amalgamation of various networks and protocols provided by a communication service provider ("CSP") to allow access to the communications network 102 for a variety of device types. For example, the communications network 102 may be a combination of a public switched telephone network ("PSTN") providing access for traditional analog phones, a cellular telephone network for cellular telephones, and an internet protocol ("IP") backbone network hosting Internet traffic for a variety of communications, including, but not limited to, Web browsing, email, instant messaging ("IM"), Voice over IP ("VoIP"), and video streaming. In addition, the various networks that make up the communications network 102 may be bridged or otherwise interconnected, allowing communication among the various device types across networks.

One or more individual users (referred to herein collectively as user 104) may utilize a number of communication devices 106A-106D (referred to herein collectively as communication devices 106) attached to the communications network 102. For example, the user 104 may utilize an analog or VoIP telephone 106A for voice calls, a cellular telephone 106B for voice calls and text messaging, a personal computer ("PC") 106C for email and instant messaging, and a set-top box 106D for voice and video calls. It will be appreciated that many other devices known in the art beyond the communication devices 106 described herein may be utilized by the user 104 to communicate on the communications network 102.

The environment 100 also includes a universal address book server 108. According to embodiments, the universal address book server 108 is a network-based server that provides universal access to a centralized user address book 110 for users, such as the user 104, of the communications network 102. The universal address book server 108 may provide a set of services that allows the users to maintain a single, centralized list of contacts in the user address book 110 along with details for each. The services provided by the universal address book server 108 may include a maintenance service 112, a synchronization service 114, and a query service 116, each of which will be described in more detail below. These services may all utilize a set of address book core services 118 to interface with the user address book 110 for each user 104. It will be appreciated by one skilled in the art that, while the universal address book server 108 is illustrated in FIG. 1 and described herein as a single, logical server, the user address books and the provided services may be individual components of many different systems operated by the CSP and may execute on a variety of diverse platforms.

Figure 2:
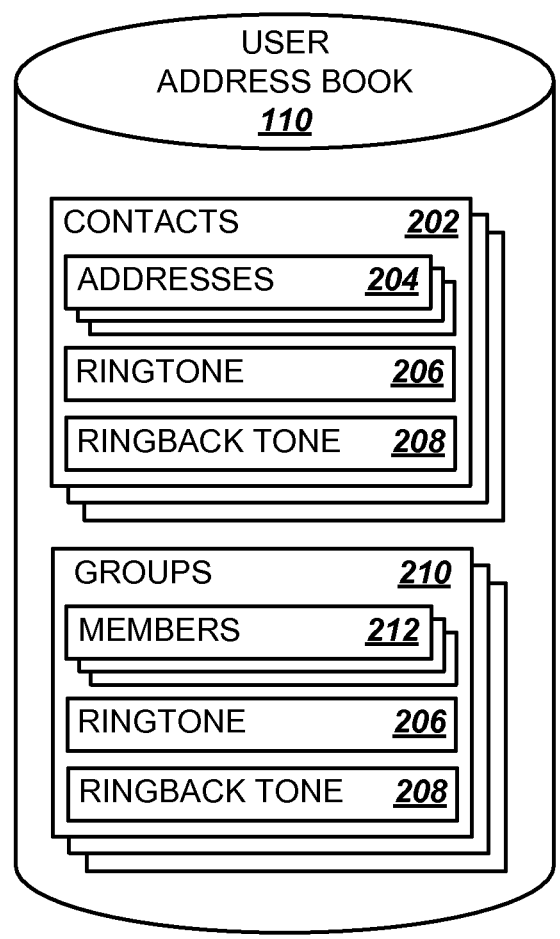
FIG. 2 is a block diagram providing further details of the operating environment, in accordance with exemplary embodiments.

As illustrated in FIG. 2, each user address book 110 may include one or more contacts 202. Each of the contacts 202 includes a list of addresses 204 for the contact, which may include phone numbers, email addresses, instant messaging handles, IP addresses, and other addresses of communication endpoints related to the contact. In one embodiment, each of the contacts 202 also includes an associated ringtone 206. The ringtone 206 is a digital representation of a tone, musical notes, song, spoken words, or any other sound that can be recorded and digitized. The ringtone 206 may be stored in any number of formats known in the art, including, but not limited to, waveform audio format ("WAV"), MPEG-1 Audio Layer 3 ("MP3"), Advanced Audio Coding ("AAC"), or Ring Tone Text Transfer Language ("RTTTL"). The ringtone 206 may be played by one or more of the user's communication devices 106 connected to the communications network 102 in response to an incoming communication from the associated contact person.

According to another embodiment, each user address book 110 may also contain one or more groups 210. Each of the groups 210 includes a list of members 212 which may consist of identifiers of contacts 202 in the user address book 110 of the user 104. Each of the groups 210 may also include an associated ringtone 206. As above, the ringtone 206 may be played by one of the user's communication devices 106 connected to the communications network 102 in response to an incoming communication from any of the members 212 in the group 210. It will be appreciated by one skilled in the art that the user address book 110 may contain many more details regarding contacts 202 and groups 210 than those depicted in FIG. 2 and described above, including, but not limited to, names, employment information, mailing addresses, photos, birthdays, anniversaries, spouses' names, availability information, and website links related to the contact person or group.

In a further embodiment, each of the contacts 202 or groups 210 may also include an associated ringback tone 208. Similar to the ringtone 206, the ringback tone 208 is a digital representation of a sound that may be played at the communication device of the associated contact person or member of the group ("the caller") when a call from the caller is initiated to the user 104, as will be described below in regard to FIG. 5. Alternatively, the ringtone 206 associated with the caller may be used as the ringback tone played at the caller's communication device.

The user 104 may utilize any number of methods commonly known in the art to maintain the user address book 110. According to one embodiment, the universal address book server 108 provides the maintenance service 112 available across the communications network 102 that allows the user 104 to maintain their user address book 110, as further illustrated in FIG. 1. The user 104 may access the maintenance service 112 through a Web browser, for example, executing on the PC 106C attached to the communications network 102. The maintenance service 112 may provide facilities for the user 104 to add, modify, and delete the contacts 202 and groups 210 as well as update the ringtones 206 and ringback tones 208 associated with each. The maintenance service 112 may provide the capability of the user 104 to upload the ringtones 206 and ringback tones 208 from the PC 106C or download ringtones and ringback tones from external sources. The ringtones 206 and ringback tones 208 may be available from external sources for free or for a charge, and may include a variety of music, snippets from movies, recorded sounds, tones, MIDI files, etc.

For example, the user 104 may utilize a Web browser to access the maintenance service 112 and add information regarding a contact person (or contact persons) 120 to the contacts 202 in the user address book 110. The information added may include an address 204 consisting of the telephone number of a cellular telephone 106E belonging to the contact person 120. The user 104 may further upload a snippet of a song as the ringtone 206 associated with the individual. The song may be selected by the user 104 based on a context known to the user that relates the tune or lyrics of the song with the contact person 120, for example.

In another embodiment, in order to facilitate caller-specific ringtones across all communication devices 106 utilized by the user 104, the universal address book server 108 provides the synchronization service 114. The synchronization service 114 provides facilities to ensure that the information related to the contacts 202 and groups 210 is synchronized between the user address book 110 and the user's communication devices 106, including the ringtones 206 and ringback tones 208 associated with the contacts 202 and groups 210. The synchronization service 114 may be implemented using a standard synchronization protocol, such as Synchronization Markup Language ("SyncML"). The synchronization service 114 may provide facilities to accept changes made to the information related to the contacts 202 and groups 210 on one of the communication devices 106 and apply those changes to the user address book 110. The synchronization service 114 may then notify the other communication devices 106 utilized by the user 104 of the changes to the information related to the contacts 202 and groups 210, allowing those devices to update their local storage of information.

The synchronization service 114 may also detect changes to the user address book 110 made through the maintenance service 112 and further notify the user's communication devices 106 of the changes. It will be appreciated that the synchronization service 114 may support a wide variety of communication devices through SyncML, either natively or through third-party add-ons, including cell phones or personal digital assistants ("PDAs"), such as the APPLE® IPHONE™ mobile digital device from Apple, Inc. of Cupertino, Calif., and personal information manager software running on PCs, such as the MICROSOFT® OUTLOOK® messaging and collaboration client from Microsoft Corporation of Redmond, Wash. It will further be appreciated that any number of methods, interfaces, and protocols commonly known in the art may be utilized by the synchronization service 114 to keep the information related to the contacts 202 and groups 210 synchronized between the user address book 110 on the universal address book server 108 and the user's communication devices 106. It is intended that this application include all such methods, interfaces, and protocols.

According to a further embodiment, the universal address book server 108 also provides the query service 116. The query service 116 provides facilities for the communication devices 106 and other components operating on the communications network 102 to access the information in the user address book 110. The query service 116 may be utilized by the communication devices 106 or components that do not store local copies of the information related to the contacts 202 and groups 210, do not support synchronization through the synchronization service 114, or require real-time access to the user address book 110.

For example, a communication control service 122 operated by the CSP or a third party on the communications network 102 may be responsible for establishing voice calls between the communication devices 106. The communication control service 122 may be a PSTN to VoIP gateway, for example. If the contact person 120 from the example above ("the caller") initiates a voice call from the cellular telephone 106E belonging to the caller to the VoIP telephone 106A of the user 104, the communication control service 122 may access the user address book 110 of the user to retrieve the ringback tone 208 associated with the caller. The communication control service 122 may then use the retrieved ringback tone 208 to play to the speaker of the cellular telephone 106E of the caller while establishing the call with the user's telephone 106A, as will be described in more detail below in regard to FIG. 5.

In another example, if the user 104 receives an incoming email or instant message from the contact person 120 at the user's PC 106C, the email or instant messaging client software executing on the PC 106C may access the user address book 110 through the query service 116 in order to lookup the ringtone 206 associated with the contact person 120, and play the associated ringtone 206 to signal the user of the received message. It will be appreciated that many methods and protocols commonly known in the art may be utilized by the query service 116 to facilitate queries of the user address book 110 by communication control services 122, communication devices 106, and PC-based software, including but not limited to, simple object access protocol ("SOAP") based Web services. It is intended that this application include all such methods and protocols. It will be further appreciated that the contact person 120 may be an actual person or it may be an answering machine or other automated device.

Figure 3:
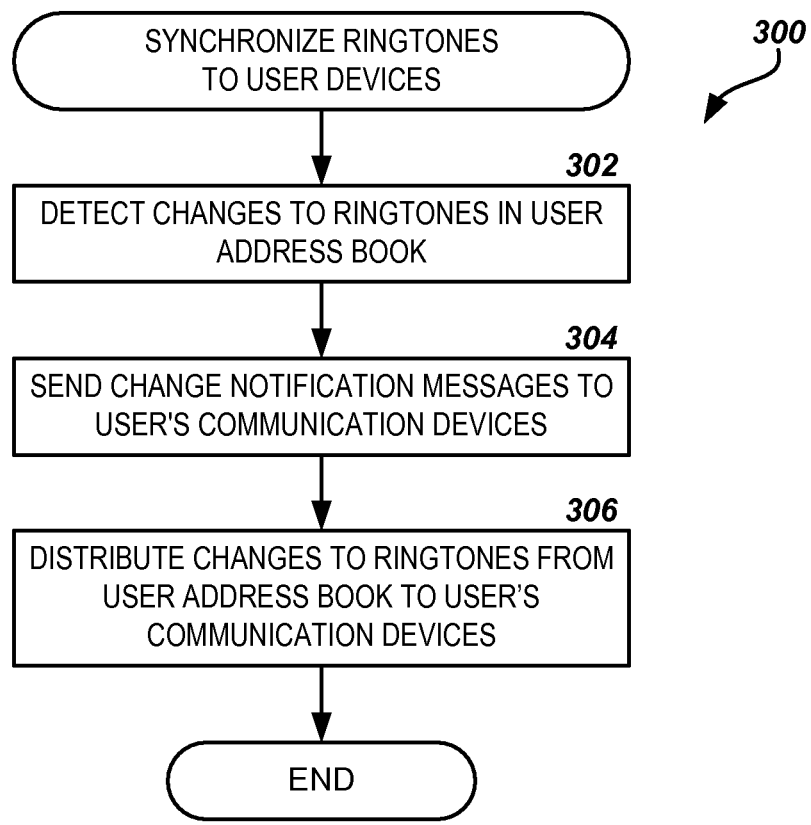
FIG. 3 is a flow diagram illustrating one method for synchronizing ringtones between a universal address book and communication devices utilized by a user, in accordance with exemplary embodiments.
Figure 4:
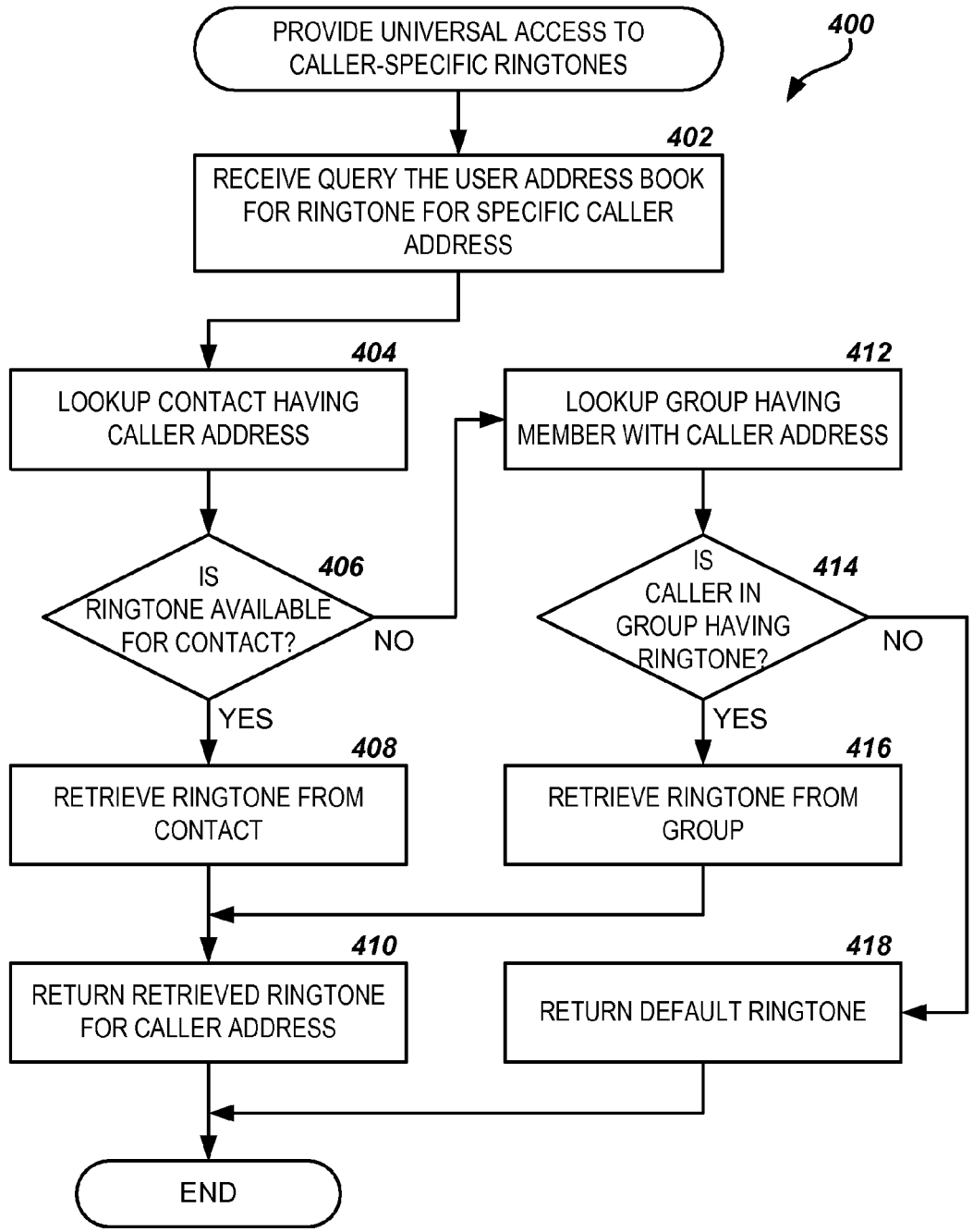
FIG. 4 is a flow diagram illustrating a method for querying a universal address book for a ringtone associated with a specific caller, in accordance with exemplary embodiments.
Figure 5:
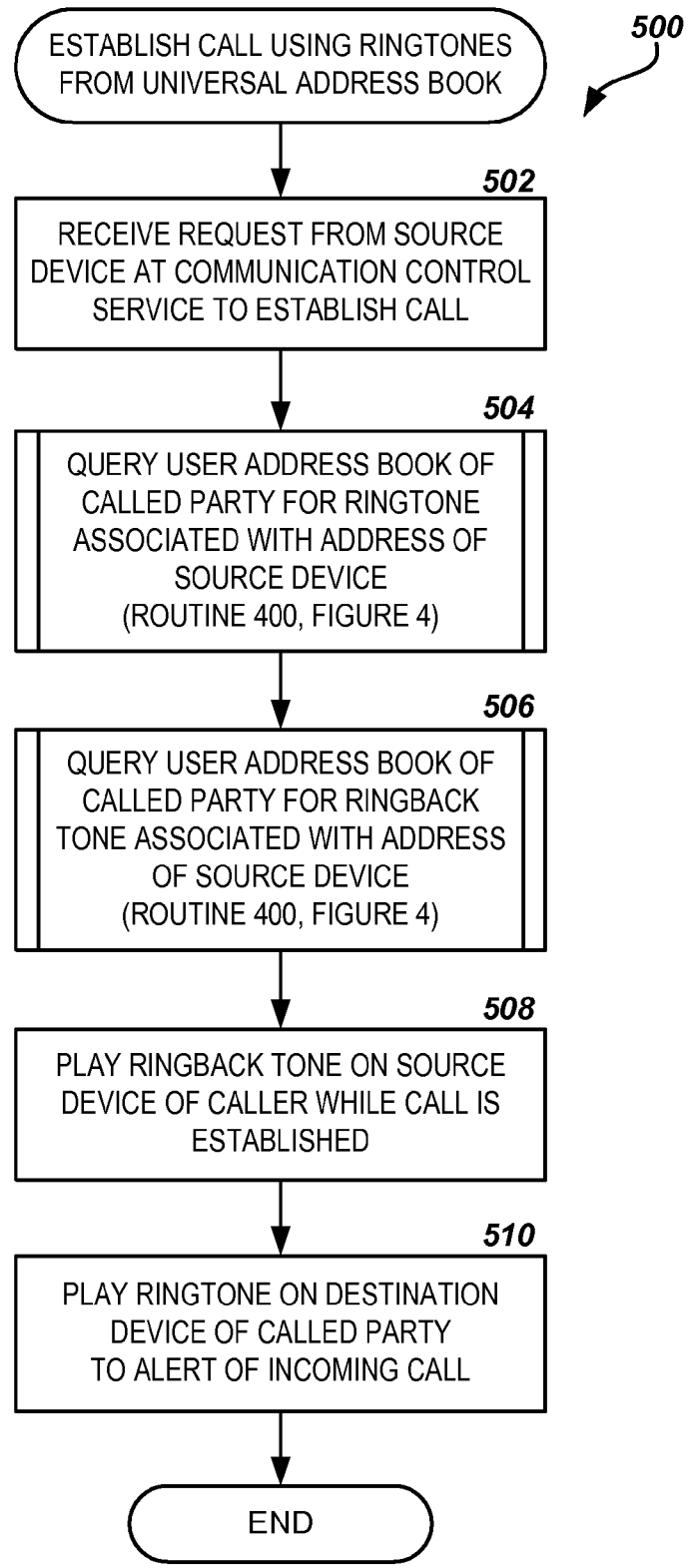
FIG. 5 is a flow diagram illustrating a method for retrieving caller-specific ringtones from a universal address book and utilizing the ringtones to setup a voice call, in accordance with exemplary embodiments.

Referring now to FIGS. 3-5, additional aspects regarding the operation of the components and software modules described above will be provided. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof.

It should also be appreciated that, while the operations are depicted in FIGS. 3-5 as occurring in a sequence, various operations described herein may be performed by different components or modules at different times. In addition, more or fewer operations may be performed than shown, and the operations may be performed in a different order than illustrated in FIGS. 3-5.

FIG. 3 illustrates one method for synchronizing the ringtones 206 between the user address book 110 and the communication devices 106 utilized by the user 104, according to embodiments described herein. A routine 300 begins at operation 302, where the synchronization service 114 component of the universal address book server 108 detects changes to the information related to the contacts 202 and groups 210 in the user address book 110, specifically the ringtones 206 or ringback tones 208. The changes to the ringtones 206 or ringback tones 208 may have been made by the user 104 directly in the user address book 110 through the maintenance service 112, or made in the local copy of the information maintained in one of the user's communication devices 106, and then synchronized with the user address book 110 through the synchronization service 114.

Upon detecting the changes to the ringtones 206 or ringback tones 208, the routine 300 moves from operation 302 to operation 304, where the synchronization service 114 informs the user's communication devices 106 of the changes to ensure these communication devices 106 synchronize the changes to the local copies of the information. The synchronization service 114 may have access to a list of the user's communication devices 106 through a provisioning service or other facility provided by the CSP. The synchronization service 114 may actively notify the communication devices 106 that the changes have been made through notification messages transmitted to the communication devices 106, based on the synchronization protocol(s) utilized and the synchronization capabilities of each communication device 106. For example, using the SyncML protocol, the synchronization service 114 may initiate a server alerted synchronization for each communication device 106. Alternatively, the synchronization service 114 may flag the changes made to the ringtones 206 and ringback tones 208 in the user address book 110 so that subsequent synchronization requests to the synchronization service made by the user's communication devices 106 will retrieve the changed information.

From operation 304, the routine 300 proceeds to operation 306, where the synchronization service 114 distributes the changes to the ringtones 206 and ringback tones 208 to the communication devices 106 of the user 104. The changed ringtones 206 and ringback tones 208 may be included in the notification messages transmitted to the communication devices 106 in operation 304, or the synchronization service 114 may respond individually to synchronization requests from individual communication devices 106 with the changed information. The choice of methodology may depend on the synchronization protocol(s) utilized and the synchronization capabilities of each communication device 106. It will be appreciated that any number of methods and protocols known in the art may be utilized by the synchronization service 114 to synchronize the ringtones 206 and ringback tones 208 between the user address book 110 and the communication devices 106, and it is intended that this application include all such methods and protocols. From operation 306, the routine 300 ends.

FIG. 4 illustrates another method for providing universal access to caller-specific ringtones, according to embodiments described herein. Specifically, an exemplary routine 400 for querying the user address book for a ringtone 206 associated with a specified caller address is illustrated. The routine 400 begins at operation 402, where the query service 116 component of the universal address book server 108 receives a request to query the user address book 110 for a ringtone 206 associated with a specific caller address. The request may come from a communication device 106 or other component that does not store a local copy of the information related to the contacts 202 and groups 210 or that does not support synchronization through the synchronization service 114, such as the communication control service 122 described above in regard to FIG. 1.

The specified caller address may depend on the type of communication being handled by the device or component. For example, if the device or component is a communication control service 122 handling a voice call, the specified caller address may be a telephone number. In another example, if the device or component is a PC 106C running an instant messenger client, the specified caller address may be an email address or instant messenger handle.

Upon receiving the request, the routine 400 moves from operation 402 to operation 404, where the query service 116 searches through the addresses 204 of each of the contacts 202 in the user address book 110 to find a match for the specified caller address. If, at operation 406, a match is found for a contact having an associated ringtone 206, the routine 400 proceeds to operation 408 where the query service 116 retrieves the ringtone 206 associated with the located contact. The routine 400 then proceeds from operation 408 to operation 410, where the retrieved ringtone 206 is returned to the calling device or component. From operation 410, the routine 400 then ends.

If, however, at operation 406, no contact is found having an address that matches the specified caller address, the routine 400 proceeds to operation 412, where the query service 116 searches through the addresses 204 of the members 212 of each of the groups 210 in the user address book 110 to find a match for the specified caller address. If, at operation 414, a match is found for a group having a member with the specified caller address, the routine 400 proceeds to operation 416, where the query service 116 retrieves the ringtone 206 associated with the located group. From operation 416, the routine 400 proceeds to operation 410 where the retrieved ringtone 206 is returned to the calling device or component.

If, however, at operation 414, no group is found having a member with the specified caller address, the routine 400 proceeds to operation 418, where the query service 116 returns a default ringtone to the calling device or component. The default ringtone may be specific to the user 104, or may be globally set. Alternatively, at operation 418, the query service 116 may return an indication to the calling device or component of no ringtone found. The calling device or component can then substitute its own default ringtone for the operation to be performed. From operation 418, the routine 400 ends. It will be appreciated that, while the routine 400 is shown in FIG. 4 and described herein as querying the user address book 110 for a ringtone 206, the same method may be utilized by the query service 116 to query the user address book 110 for a ringback tone 208 associated with a specified caller address.

FIG. 5 illustrates an exemplary routine 500 for retrieving caller-specific ringtones from the user address book 110 provided by the universal address book server 108, and utilizing the ringtones to setup a voice call, according to embodiments described herein. The routine 500 begins at operation 502, where the communication control service 122, as described above in regard to FIG. 1, receives a request from a source device, such as the cellular telephone 106E of the contact person 120 ("the caller"), to establish a voice call with one or more of the communication devices 106 of the user 104.

Upon receiving the request to establish a voice call, the routine 500 proceeds from operation 502 to operation 504, where the communication control service 122 queries the user address book 110 of the user 104 ("the called party") to retrieve a ringtone 206 associated with the address of the caller's device, in this example the phone number of the cellular telephone 106E. In one embodiment, the communication control service 122 uses a method of the query service 116 to retrieve the ringtone 206, such as the routine 400 described above in regard to FIG. 4. Alternatively, the communication control service 122 may be provided direct access to the user address book 110 through another facility provided by the CSP.

From operation 504, the routine 500 proceeds to operation 506, where the communication control service 122 queries the user address book 110 of the called party 104 to retrieve a ringback tone 208 associated with the address of the caller's device 106E using a method similar to that described above in operation 504. In an alternative embodiment, the communication control service 122 may substitute the ringtone 206 retrieved in operation 504 for the ringback tone 208 utilized below in operation 508.

The routine 500 then proceeds from operation 506 to operation 508, where the communication control service 122 plays the ringback tone 208 retrieved in operation 506 to the source device while the call with the user's one or more communication devices 106 is established. According to embodiments, the caller, e.g. the contact person 120, will hear the ringback tone 208 over a speaker of the source device, e.g. the cellular telephone 106E, indicating that the destination device or devices of the user 104 are "ringing." It will be appreciated by one skilled in the art that the source device may not require a local copy of the ringback tone 208 in order for the ringback tone 208 to be heard by the caller 120 during call setup.

From operation 508, the routine 500 proceeds to operation 510, where the ringtone 206 associated with the address of the caller's device 106E is played at the destination communication device or devices 106 of the user 104, for example, the user's VoIP telephone 106A. According to one embodiment, the communication control service 122 plays the ringtone 206 retrieved in operation 505 to a speaker on the user's telephone 106A to indicate to the user 104 that an incoming call is present.

In another embodiment, the destination device plays a local copy of the ringtone 206 associated with the address of the caller's device 106E previously retrieved from the user address book 110. For example, the user's cellular telephone 106B may store a local copy of the information related to the contacts 202 and groups 210, including the ringtones 206, which is kept in sync with that in the user address book 110 of the user 104 utilizing a method similar to that described above in regard to FIG. 3. Upon receiving a signal of an incoming call, the user's cellular telephone 106B may utilize the caller-ID information present in the inbound call signal to lookup the ringtone 206 associated with the address of the caller's device 106E and play the ringtone 206 on a speaker of the cellular telephone 106B to alert the user 104 of the incoming call. It will be appreciated that many other methods of playing a caller-specific ringtone 206 on a communication device 106 of the user 104 may be imagined by one skilled in the art, and it is intended that this application include all such methods of playing the caller-specific ringtone 206 on the device 106. From operation 510, the routine 500 ends.

Figure 6:
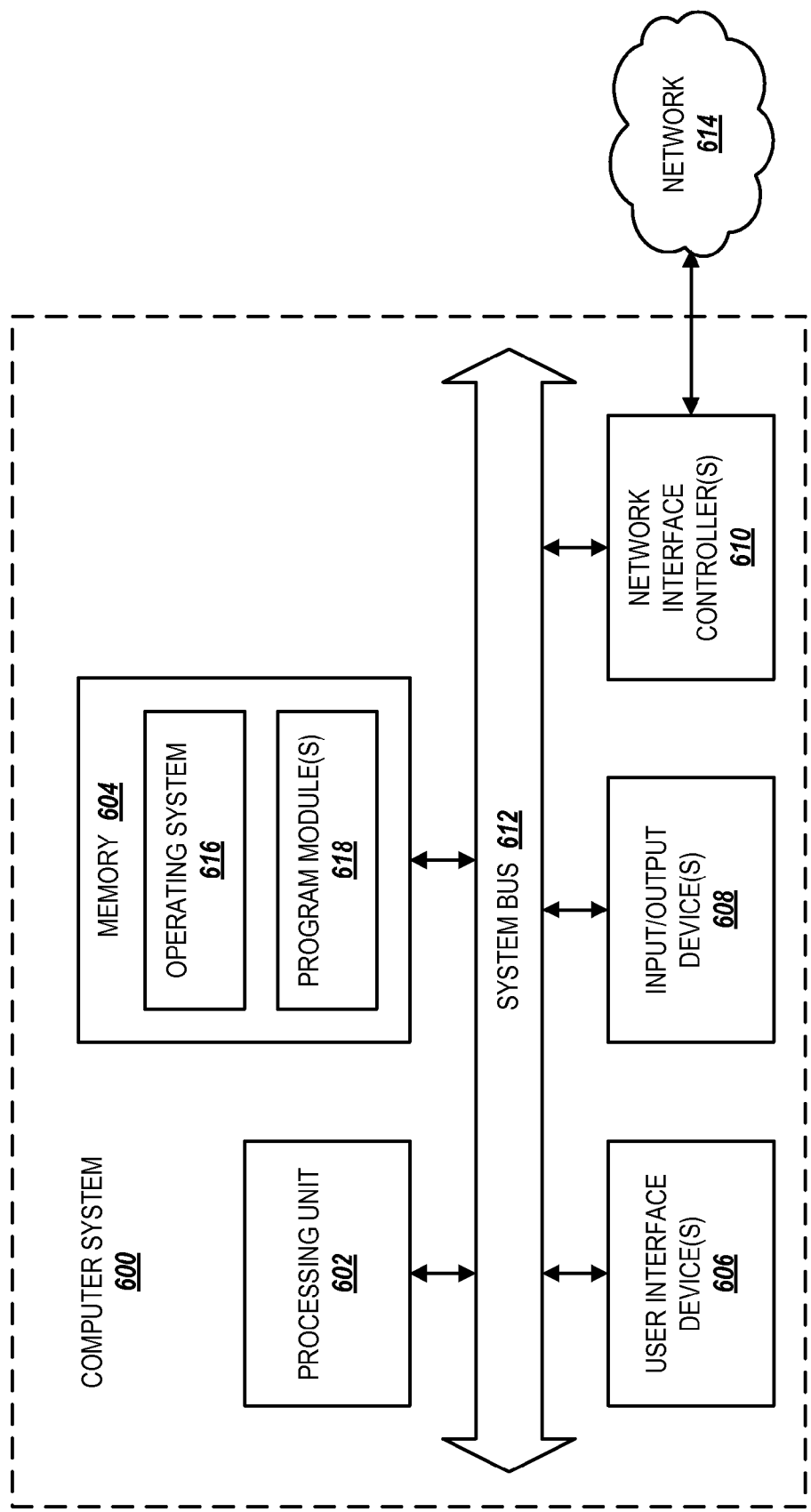
FIG. 6 is a block diagram showing an illustrative computer hardware and software architecture for a computing system capable of implementing aspects of the embodiments presented herein.

FIG. 6 is a block diagram illustrating a computer system 600 capable of executing the software components described herein for providing universal access to caller-specific ringtones, in accordance with exemplary embodiments. The computer system 600 may be representative of the universal address book server 108 or one of the communication devices 106, described above in regard to FIG. 1. In addition, the computer system 600 may be utilized to implement the communication control service 122, also described above in regard to FIG. 1. The computer system 600 may include a processing unit 602, a memory 604, one or more user interface devices 606, one or more input/output ("I/O") devices 608, and one or more network interface controllers 610, each of which is operatively connected to a system bus 612. The bus 612 enables bi-directional communication between the processing unit 602, the memory 604, the user interface devices 606, the I/O devices 608, and the network interface controllers 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the computer. Processing units are well-known in the art, and therefore not described in further detail herein.

The memory 604 communicates with the processing unit 602 via the system bus 612. In one embodiment, the memory 604 is operatively connected to a memory controller (not shown) that enables communication with the processing unit 602 via the system bus 612. The memory 604 includes an operating system 616 and one or more program modules 618, according to exemplary embodiments. Examples of operating systems, such as the operating system 616, include, but are not limited to, WINDOWS® and WINDOWS SERVER® operating systems, and WINDOWS MOBILE® software from Microsoft Corporation, LINUX, SYMBIAN™ OS from Symbian Software Ltd., BREW® from Qualcomm Incorporated, and ANDROID™ from Google, Inc. An example of the program module 618 includes the maintenance service 112, the synchronization service 114, the query service 116, the address book core services 118, and the communication control service 122, each of which was described above in regard to FIG. 1. In one embodiment, the program modules 618 are embodied in computer-readable media containing instructions that, when executed by the processing unit 602, perform the routines 300, 400, and 500 for providing universal access to caller-specific ringtones, as described in greater detail above in regard to FIGS. 3, 4, and 5, respectively. According to further embodiments, the program modules 618 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600.

The user interface devices 606 may include one or more devices with which a user accesses the computer system 600. The user interface devices 606 may also include, but are not limited to, computers, servers, personal digital assistants, cellular phones, or any suitable computing devices. The I/O devices 608 enable a user to interface with the program modules 618. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a speaker, a display screen, or a printer.

The network interface controllers 610 enable the computer system 600 to communicate with other networks or remote systems via a network 614, such as the communications network 102. Examples of the network interface controllers 610 may include, but are not limited to, a modem, a radio frequency ("RF") or infrared ("IR") transceiver, a telephonic interface, a bridge, a router, or a network card. The network 614 may include a wireless network such as, but not limited to, a wireless local area network ("WLAN") such as a Wi-Fi network, a wireless wide area network ("WWAN"), a wireless personal area network ("WPAN") such as BLUETOOTH, a wireless metropolitan area network ("WMAN") such as a WiMAX network, or a cellular network. Alternatively, the network 614 may be a wired network such as, but not limited to, a WAN such as the Internet, a LAN such as an Ethernet network, a wired personal area network ("PAN"), or a wired metropolitan area network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:
1. A method comprising:
receiving, at a universal address book server, from a first communication device of a called party, a query specifying a caller address associated with an incoming communication directed to the first communication device of the called party, the universal address book server comprising a processor and an address book of the called party, the address book of the called party comprising a first contact associated with a first ringtone and a group associated with a second ringtone, the group comprising a second contact and a third contact, wherein the first contact is further associated with a first plurality of addresses, the second contact is associated with a second plurality of addresses, and the third contact is associated with a third plurality of addresses;
determining, by the universal address book server, that none of the first plurality of addresses associated with the first contact of the address book of the called party matches the caller address associated with the incoming communication directed to the first communication device of the called party;

determining that one of the second plurality of addresses associated with the second contact of the group of the address book of the called party matches the caller address associated with the incoming communication directed to the first communication device of the called party;

in response to determining that an address of the second plurality of addresses associated with the second contact of the group of the address book of the called party matches the caller address associated with the incoming communication directed to the first communication device of the called party, retrieving, by the universal address book server, the second ringtone associated with the group, and returning, by the universal address book server, to the first communication device of the called party, the second ringtone associated with the group for use by the first communication device of the called party to inform the called party that the incoming communication directed to the first communication device of the called party is from a contact of the group;

detecting, by the universal address book server, a change in a local copy of information related to the first ringtone associated with the first contact stored on a second communication device of the called party; and in response to detecting the change in the local copy of the information related to the first ringtone associated with the first contact stored on the second communication device of the called party, modifying, by the universal address book server, the first ringtone associated with the first contact of the address book of the called party maintained at the universal address book server to synchronize the address book of the called party maintained at the universal address book server with the local copy of the information related to the first ringtone associated with the first contact stored on the second communication device of the called party, and notifying, by the universal address book server, a third communication device of the called party that the first ringtone associated with the first contact of the address book of the called party maintained at the universal address book server has been modified to allow the third communication device to synchronize a local copy of information related to the first ringtone associated with the first contact stored on the third communication device of the called party with the address book of the called party maintained at the universal address book server.

2. The method of claim 1, wherein notifying the third communication device of the called party comprises transmitting, by the universal address book server, to the third communication device, a notification message indicating that the first ringtone associated with the first contact of the address book of the called party maintained at the universal address book server has been modified.

3. The method of claim 2, wherein the notification message comprises the first ringtone associated with the first contact of the address book of the called party maintained at the universal address book server as modified.

4. The method of claim 1, wherein the first contact is further associated with a ringback tone.

5. The method of claim 1, wherein the first communication device of the called party is a personal computer executing a communications software program.

6. The method of claim 1, further comprising providing, by the universal address book server, to a device associated with the caller address of the incoming communication while the incoming communication directed to the first communication device of the called party is established, a ringback tone, wherein the ringback tone provided to the device associated with the caller address of the incoming communication is the second ringtone associated with the group.

7. A universal address book server comprising:

a processor;

an address book of a called party, the address book of the called party comprising a first contact associated with a first ringtone and a group associated with a second ringtone, the group comprising a second contact and a third contact, wherein the first contact is further associated with a first plurality of addresses, the second contact is associated with a second plurality of addresses, and the third contact is associated with a third plurality of addresses; and a memory storing instructions that, when executed by the processor, cause the processor to perform operations comprising receiving, from a first communication device of the called party, a query specifying a caller address associated with an incoming communication directed to the first communication device of the called party, determining that none of the first plurality of addresses associated with the first contact of the address book of the called party matches the caller address associated with the incoming communication directed to the first communication device of the called party, determining that one of the second plurality of addresses associated with the second contact of the group of the address book of the called party matches the caller address associated with the incoming communication directed to the first communication device of the called party, in response to determining that an address of the second plurality of addresses associated with the second contact of the group of the address book of the called party matches the caller address associated with the incoming communication directed to the first communication device of the called party, retrieving the second ringtone associated with the group, and returning, to the first communication device of the called party, the second ringtone associated with the group for use by the first communication device of the called party to inform the called party that the incoming communication directed to the first communication device of the called party is from a contact of the group, detecting a change in a local copy of information related to the first ringtone associated with the first contact stored on a second communication device of the called party, and in response to detecting the change in the local copy of the information related to the first ringtone associated with the first contact stored on the second communication device of the called party, modifying the first ringtone associated with the first contact of the address book of the called party maintained at the universal address book server to synchronize the address book of the called party maintained at the universal address book server with the local copy of the information related to the first ringtone associated with the first contact stored on the second communication device of the called party, and notifying a third communication device of the called party that the first ringtone associated with the first contact of the address book of the called party maintained at the universal address book server has been modified to allow the third communication device to synchronize a local copy of information related to the first ringtone associated with the first contact stored on the third communication device of the called party with the address book of the called party maintained at the universal address book server.

8. The universal address book server of claim 7, wherein notifying the third communication device of the called party comprises transmitting, by the universal address book server, to the third communication device, a notification message indicating that the first ringtone associated with the first contact of the address book of the called party maintained at the universal address book server has been modified.

9. The universal address book server of claim 8, wherein the notification message comprises the first ringtone associated with the first contact of the address book of the called party maintained at the universal address book server as modified.

10. The universal address book server of claim 7, wherein the first contact is further associated with a ringback tone.

11. The universal address book server of claim 7, wherein the operations further comprise providing, to a device associated with the caller address of the incoming communication while the incoming communication directed to the first communication device of the called party is established, a ringback tone, wherein the ringback tone provided to the device associated with the caller address of the incoming communication is the second ringtone associated with the group.

12. A computer readable storage medium storing instructions that, when executed by a universal address book server comprising a processor and an address book of a called party, cause the universal address book server to perform operations comprising:

receiving, from a first communication device of the called party, a query specifying a caller address associated with an incoming communication directed to the first communication device of the called party, the address book of the called party comprising a first contact associated with a first ringtone and a group associated with a second ringtone, the group comprising a second contact and a third contact, wherein the first contact is further associated with a first plurality of addresses, the second contact is associated with a second plurality of addresses, and the third contact is associated with a third plurality of addresses;

determining that none of the first plurality of addresses associated with the first contact of the address book of the called party matches the caller address associated with the incoming communication directed to the first communication device of the called party;

determining that one of the second plurality of addresses associated with the second contact of the group of the address book of the called party matches the caller address associated with the incoming communication directed to the first communication device of the called party;

in response to determining that an address of the second plurality of addresses associated with the second contact of the group of the address book of the called party matches the caller address associated with the incoming communication directed to the first communication device of the called party, retrieving the second ringtone associated with the group, and returning, to the first communication device of the called party, the second ringtone associated with the group for use by the first communication device of the called party to inform the called party that the incoming communication directed to the first communication device of the called party is from a contact of the group;

detecting a change in a local copy of information related to the first ringtone associated with the first contact stored on a second communication device of the called party; and in response to detecting the change in the local copy of the information related to the first ringtone associated with the first contact stored on the second communication device of the called party, modifying the first ringtone associated with the first contact of the address book of the called party maintained at the universal address book server to synchronize the address book of the called party maintained at the universal address book server with the local copy of the information related to the first ringtone associated with the first contact stored on the second communication device of the called party, and notifying a third communication device of the called party that the first ringtone associated with the first contact of the address book of the called party maintained at the universal address book server has been modified to allow the third communication device to synchronize a local copy of information related to the first ringtone associated with the first contact stored on the third communication device of the called party with the address book of the called party maintained at the universal address book server.

13. The computer readable storage medium of claim 12, wherein the first contact is further associated with a ringback tone.

14. The computer readable storage medium of claim 12, wherein the group is further associated with a ringback tone.

15. The computer readable storage medium of claim 12, wherein the operations further comprise providing, to a device associated with the caller address of the incoming communication while the incoming communication directed to the first communication device of the called party is established, a ringback tone, wherein the ringback tone provided to the device associated with the caller address of the incoming communication is the second ringtone associated with the group.

16. The computer readable storage medium of claim 12, wherein notifying the third communication device of the called party comprises transmitting, to the third communication device, a notification message indicating that the first ringtone associated with the first contact of the address book of the called party maintained at the universal address book server has been modified.

17. The computer readable storage medium of claim 16, wherein the notification message comprises the first ringtone associated with the first contact of the address book of the called party maintained at the universal address book server as modified.

\* \* \* \* \*